Dec. 27, 1960  F. H. CHAMBERS ET AL  2,966,189
PLUG-TYPE REPAIR FOR TIRES

Filed June 9, 1960  3 Sheets-Sheet 1

INVENTORS.
Frank H. Chambers +
Gil B. Moote
by Mahoney, Miller & Rambo
ATTYS.
BY Wm. V. Miller

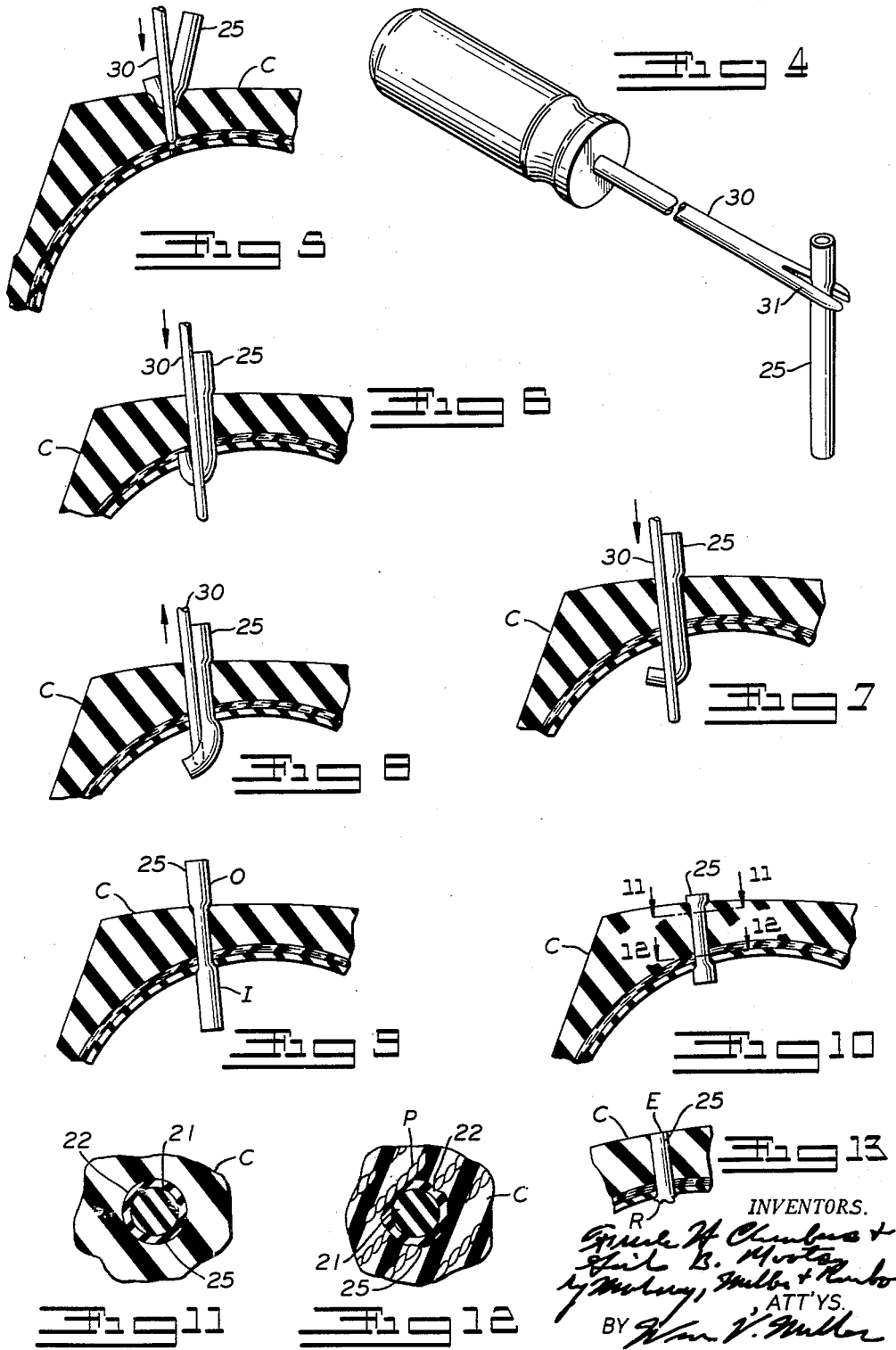

Dec. 27, 1960     F. H. CHAMBERS ET AL     2,966,189
PLUG-TYPE REPAIR FOR TIRES
Filed June 9, 1960     3 Sheets-Sheet 3

INVENTORS.
Frank H. Chambers +
Earl B. Minter
By Mcluney, Miller & Banks
ATT'YS.
BY Wm. V. Miller United States Patent Office 2,966,189
Patented Dec. 27, 1960

2,966,189
PLUG-TYPE REPAIR FOR TIRES

Frank H. Chambers and Gail B. Moats, Johnstown, Ohio, assignors to Technical Rubber Company, Inc., Johnstown, Ohio, a corporation of Ohio Filed June 9, 1960, Ser. No. 34,981

10 Claims. (Cl. 152—370)

This invention relates to a plug-type repair for tires. It has to do, more particularly, with a tire plug which can be inserted in a puncture or injury in a tire casing from inside or outside the casing, in a tire of the tubeless type, and which will be vulcanized in place by the running temperature of the tire.

This application is a continuation-in-part of our copending application Serial No. 828,323, filed July 20, 1959, now abandoned.

At the present time, it is common to use plugs for repairing tires and particularly tubeless tires but these plugs are formed solely of cured rubber or other cured material which will not readily vulcanize. The plugs are inserted into the puncture or injury opening in the tire casing either from the inside or the outside of the casing but do not adhere effectively to the sides of the opening or injury because the cured material of the plug will not bond effectively to the cured rubber of the tire casing even with the application of heat. It is well-known in the art that two cured rubbers will not effectively bond to each other even though vulcanizing cement or similar cements are provided between the two rubber members and heat and pressure are employed.

It has been proposed in the prior art to provide a plug-type repair unit consisting of a vulcanized core which carries a coating of rubber that is initially uncured and is intended to be subsequentially cured. This coating will not cure unless a chemical reaction is brought about by the use of an additional agent. It has been proposed that the uncured coating be provided with sulfur only so that it will not cure until an accelerator is added. With this type of repair unit the accelerator is added at the time the core is inserted in the injury opening by means of a vulcanizing paste, containing the accelerator, which is applied to the core as it is inserted in the injury opening and then road heat developed in the tire is supposed to bring about reaction between the accelerator in the paste and the sulfur in the coating to obtain vulcanization. It has been found in actual practice that effective vulcanization does not occur for various reasons, such as the difficulty of uniform application of paste to the coating, the lack of sufficient body of the bonding material, etc. Furthermore, complicated equipment and procedures are required to insert the core and apply the paste to the coating during insertion. Also, it is stressed in connection with this prior art proposal, that it is important to keep the accelerators in the vulcanized plug from reaching the uncured coating before use of the repair unit but, in actual practice, this does occur and after a short interval such accelerators will reach and react with the sulfur in the coating and will cause vulcanizing or partial vulcanizing of the coating. The result is that the repair unit has very limited "shelf life."

It is the main object of this invention to provide a plug-type repair especially suitable for tubeless tires which is of such a nature that it can be inserted in the puncture or injury opening in the tire casing from a point either inside or outside the casing and which will effectively bond or vulcanize to the cured rubber of the tire casing merely upon the development of road heat in the repaired tire.

Another object of this invention is to provide a plug-type repair for tires and especially for tubeless tires which is of such a nature that it can be used as cold type repair or a hot type repair but is especially useful as a cold type repair since it can merely be inserted in the opening and the heat developed in the tire upon subsequent use of the repaired casing will cause self-vulcanizing of the plug and effective bonding thereof to the adjacent wall of the injury opening in the tire casing.

Various other objects will be apparent.

According to this invention, we provide a plug-type repair unit for insertion into an injury opening in a cured rubber tire casing and which will adhere effectively to the cured rubber walls of the injury opening. The repair unit comprises a plug body or core, preferably of elongated form and of solid cross section, which is of cured rubber having sufficient tensile strength to permit insertion into the opening by a suitable tool which will push it through the opening, at the same time it stretches it and reduces its cross section so that it will expand into contact with the opening after the tool is withdrawn. The peripheral wall of the core carries a coating of rubber cement, preferably substantially free of sulfur and accelerator, which cements to the core an attaching layer. This attaching layer surrounds or wraps the cement-coated core for its full length and is a layer of uncured, preferably calendered vulcanizable rubber of substantial thickness which encloses said core in intimate contact with the cement-coated peripheral wall thereof. This layer of uncured rubber is such that road heat developed in the tire or the running temperature of the tire, which is from 160° F. up, will vulcanize or cure the uncured rubber layer and will thereby form an effective bond between the peripheral wall of the cured-rubber core of the repair unit and the rubber wall of the injury opening, this being accomplished without the use of additional heat or reacting chemicals. The running temperature of the repaired tire will bring about cure or vulcanization of the uncured layer because of the nature of the layer. This layer has a high sulfur content and a particular type of accelerator incorporated therein. The sulfur and accelerator are used in such relative amounts and the accelerator is of such a nature that the running temperature of the tire, which may be as low as 160° F., will be sufficient to produce curing or vulcanizing of the layer and vulcanizing to the cured core and the cured wall of the injury opening to thereby produce an effective bond therebetween. Furthermore, this bond is produced without the use of any additional reactive chemical agents applied to the layer as the repair unit is inserted in the opening and without the use of special equipment for applying the reactive agents as the plug unit is inserted. Furthermore, the nature of the uncured layer is such that the sulfur and accelerator will not react until the temperature thereof is brought up to about 160° F. which will insure that the repair unit will have indefinite shelf life.

The accompanying drawings illustrate this invention and in these drawings:

Figure 4 is a perspective view showing the repair unit of Figure 3 slipped into a forked tool ready for insertion into the tire injury opening.

Figure 5 is a transverse sectional view through the wall of a tubeless tire casing showing the tool being used to start insertion of the plug into the injury opening.

Figure 6 is a similar view showing the inner ends of the tool and repair unit passing out of the injury opening.

Figure 7 is a similar view but showing the inner ends of the repair unit and tool pushed farther into the casing substantially beyond the inner end of the injury opening.

Figure 8 is a similar view showing the withdrawal of the forked tool.

Figure 9 is a transverse or vertical sectional view through the casing wall showing the condition of the repair unit in the injury immediately after withdrawal of the forked tool.

Figure 10 is a view similar to Figure 9 showing the ends of the repair unit trimmed off to remove excess material.

Figure 11 is a horizontal sectional view taken along line 11—11 of Figure 10.

Figure 12 is a horizontal sectional view taken along line 12—12 of Figure 10.

Figure 13 is a sectional view taken at right angles to those of Figures 11 and 12 through the repaired injury showing the repair after the tire has been used for sufficient time to vulcanize the unit in position.

Figure 1:
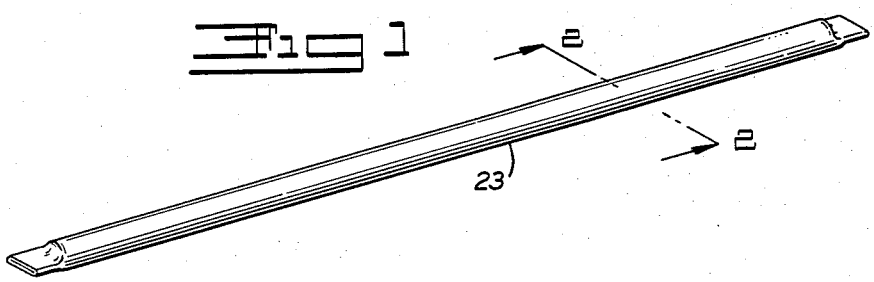
Figure 1 is a perspective view illustrating a plug-type repair unit embodying this invention.
Figure 2:
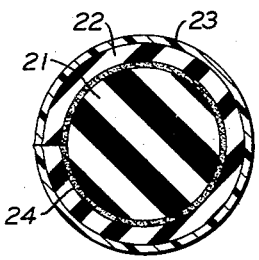
Figure 2 is a transverse or vertical sectional view taken along line 2—2 of Figure 1.

With reference to the drawings, the complete plug-type tire repair unit according to this invention is illustrated best in Figures 1 and 2. It comprises a core or body 21, a surrounding layer or wall 22 and a protective film, covering or wrapper 23. Also preferably cement 24 is applied between the core or body 21 and the annular layer or wall 22. The unit is preferably made of elongated form, as indicated in Figure 1, so that several repair lengths or sections can be cut from a single unit although it can be made of selected lengths suitable for repairs.

The body or core 21 is of solid cross section and is made from cured or vulcanized rubber. This rubber must have high tensile strength to permit its insertion into the injury without pulling apart. A tensile strength in excess of 4,000 pounds is preferred but tensile strengths as low as 3,000 pounds can be used.

The attaching layer or wall 22 which surrounds the core or body 21 is of uncured or unvulcanized elastic rubber. This surrounding wall or layer 22 is a substantial thickness of solid rubber material known as quick-cure cushion stock which is preferably calendered and will vulcanize easily and effectively at relatively low temperatures without pressure. This layer should be at least 0.010 inch in thickness and is preferably of 0.015 inch or more in thickness. Incorporated in this uncured rubber layer 22 are certain type accelerators along with a high sulfur content so that road heat alone will produce curing. Also, this layer is such that shelf life of the repair unit will be maintained indefinitely.

In order that the layer 22 can be cured solely by the running temperature of the tire, it is provided with a special type accelerator along with a high sulfur content so that it will cure at a relatively low temperature of from 160° F. to 180° F., and of course, at any higher running temperature of the tire in which the repair unit is inserted. However, so that the repair unit will have indefinite shelf life, the uncured layer will not cure at the normal temperatures to which the repair unit is subjected before use which are normally less than 100° F. but may be somewhat higher. The sulfur content of the layer is preferably 14% by weight of the rubber used in the compound of the layer but may range from 5% to 18%. The accelerator used in the layer is from the thiourea family and diphenylthiourea has been found to be most satisfactory when used in amounts of 7% by weight of the rubber used in the compound of the layer. However, any accelerator of the group can be used and be present in amounts varying from 5% to 9% by weight of the rubber used in the layer compound.

As indicated above, the layer 22 is preferably cemented to the outer surface of the core or body 21 and the cement used may be a good quality rubber-base cement. This cement preferably is substantially free of sulfur and accelerator.

The film, covering or wrapper 23 for the entire unit will protect the outer surface of the wall or layer 22 from dust and other foreign matter and this protective wrapper may be of any suitable flexible sheet material such as polyethylene.

Figure 3:
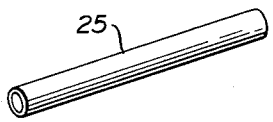
Figure 3 is a perspective view showing a length of the repair unit cut from the unit of Figure 1 with the protective wrapper removed so that it is ready for insertion into the tire injury.
Figure 14:
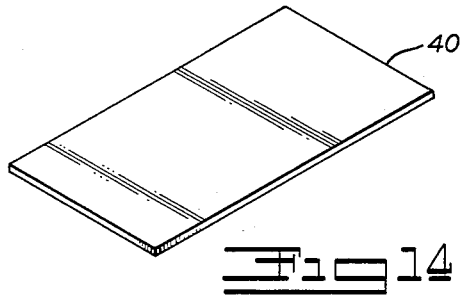
Figure 14 is a perspective view illustrating a sheet of material from which the body or core of the plug-type repair unit may be formed.
Figure 15:
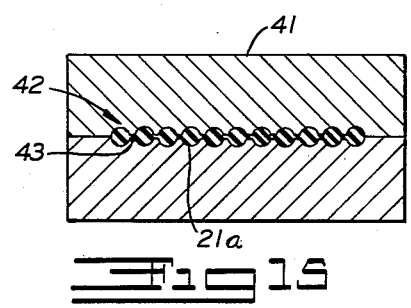
Figure 15 is a transverse sectional view illustrating the molding of the sheet of Figure 14 to produce a plurality of the cores or bodies of the repair unit.
Figure 16:
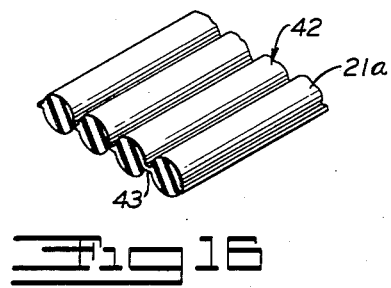
Figure 16 is a perspective view illustrating the molded multiple core or body unit after it is removed from the mold of Figure 15.

In the use of this plug-type repair unit, a proper length is cut from the unit of Figure 1 so that it will be sufficient to extend through the puncture or injury opening in the tire casing or, as indicated, it may be initially formed in proper length. This length or plug is designated by the numeral 25 and is shown in Figure 3. The protective wrapper 23 is removed before or after cutting.

The plug 25 is then inserted into the opening or puncture in the tire casing C in the manner shown in Figures 4 to 9, inclusive. The cement between the plug body 21 and the layer 22 will hold the layer on the body before and as it is inserted in the injury opening. Preferably, an inserting tool 30 of the type shown in Figure 4 is used and this tool includes a forked end 31. Before the plug 25, however, is applied to the tool 30, the tool is preferably used for applying a suitable rubber-base cement similar to the cement 24 to the wall of the injury opening in the tire casing.

To insert the plug 25, the forked end 31 of the tool is engaged with the plug adjacent one end thereof if the plug is to be used in a single section as shown. However, it can be doubled back on itself and in that case the forked end of the tool will engage it intermediate its ends. Then, as shown in Figure 5, the end of the plug is started into the opening. By continuing the pushing force on the forked tool, the leading end of the fork is forced through the opening and simultaneously the portion of the plug within the opening is stretched, as indicated in Figure 6, so that it is of less cross section than the cross sectional area of the opening through which it is passed. Eventually, the tool and the leading end of the plug will pass completely through the opening and a substantial distance into the casing, as shown in Figure 7. If the forked tool is now withdrawn, as indicated in Figure 8, the plug will tend to expand to its original cross section. This expansion will force the outer layer 22 of the plug tightly into contact with the wall of the opening or injury. Furthermore, an inner expanded portion I will be created on the inner end of the plug which will be similar to the outer portion O of original cross sectional size. This portion O will obviously be an unstretched portion of the plug. The plug 25 should be of a diameter substantially greater than that of the injury into which it is inserted since it is desirable that the inserted portion be first stretched substantially so that it will be of smaller cross section than the opening and will later expand into tight contact with the wall of the injury and permit it to expand. In fact, it is preferred that the core or body 21 be of substantially greater cross sectional area than that of the injury opening.

Excess material may be cut off the outwardly and inwardly extending plug portions O and I, respectively, as indicated in Figure 10. The plug 25 will be firmly held in place by the expansion of the material thereof into firm contact with the wall of the injury opening, as shown in Figures 10 and 11. In fact, the soft layer or wall 22 will be worked into the cords of the plies P of the tire casing as illustrated in Figure 12 making an even more effective bond.

Thus, the inserted plug 25 will be firmly held in position by the expansion of material thereof and by the cement applied between the wall of the opening and the outer surface of layer or wall 22. With the plug 25 held firmly in position in this manner, if the tire is now used, the road heat developed during usage will be sufficient to vulcanize the plug in its initially held position. This heat will be at least 160° F. and is usually 180° F. or more. This vulcanization will occur with the layer or wall 22 becoming sufficiently heated to cause reaction between the sulfur content and accelerator content thereof so that the layer will connect or bond the cured plug or body 21 to the cured rubber of the casing C. This vulcanization will be enhanced by the pressure of the body material 21 expanding the layer or wall 22 outwardly against the wall of the injury opening.

The cement 24 between the plug body 21 and the layer 22 as well as the cement on the wall of the injury opening, will also be cured or vulcanized because even though it does not have sulfur and accelerator therein, excess amounts of these agents will migrate from the layer 22, after being heated by the running temperature of the tire, into the cement so as to cause curing or vulcanizing of the cement.

We have made actual tests, with tire casings repaired by our units in which layer corresponding to the layer 22 contained 7% of the accelerator diphenylthiourea and 14% sulfur. These units were cured in the tires at a temperature of approximately 180° F. comparable to the running temperature of a tire. These tests showed that the cured layer had the following indicated hardnesses after varying periods of curing:

| Time: | Shore hardness |
| --- | --- |
| 2 hrs. | 32 |
| 4 hrs. | 35 |
| 8 hrs. | 43 |
| 16 hrs. | 47 |

Furthermore, thousands of these repair units have actually been used in repairing tubeless tire casings and road heat alone has effectively vulcanized the units in position.

After the repaired tire casing has been used for some time, the plug 25 will have the appearance shown in Figure 13 where the outer end E will be worn off flush with the outer surface of the casing and the inner end will, due to centrifugal force and flexing in the casing, become a rough button or burr R. However, the plug 25 will be so effectively bonded in place as to prevent any axial displacement of the plug relative to the injury opening.

Figure 17:
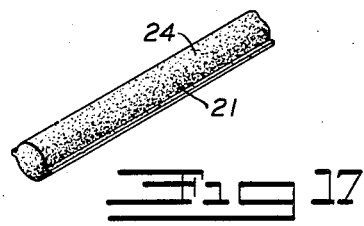
Figure 17 is a perspective view showing one of the cores or bodies separated from the multiple unit of Figure 16.
Figure 19:
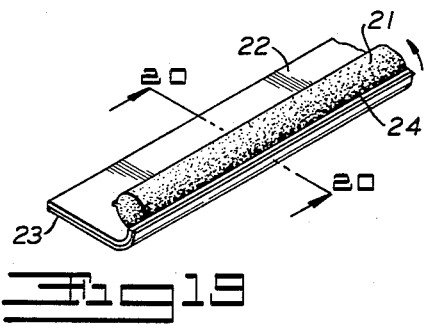
Figure 19 is a perspective view illustrating the wrapping of the core or body of Figure 17 of uncured rubber with the strip or sheet of cured rubber of Figure 18.
Figure 18:
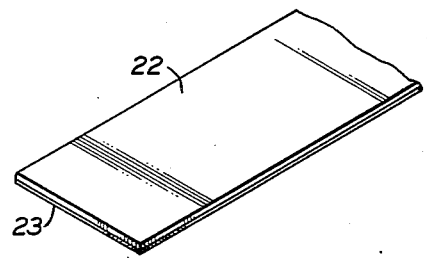
Figure 18 is a perspective view illustrating a strip or sheet of uncured rubber with a protective cover on one surface thereof.
Figure 20:
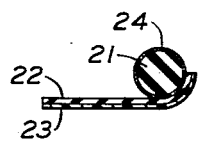
Figure 20 is a transverse sectional view taken along line 20—20 of Figure 19.

The plug-type repair unit may be produced in the manner shown in Figures 14 to 19. First, a sheet 40 of suitable rubber cushion stock to form the body is selected. This soft uncured sheet 40 is then placed in a sectional mold 41 and heat and pressure are simultaneously applied to cure it. This mold is provided with cooperating mold cavity sections which form a multiple unit 42 consisting of a plurality of cores or body sections 21a which are preferably of elongated cylindrical form and are joined together by flanges 43 which are very thin. Instead of pressure molding as described, the unit 42 may be extruded in a die of the shape of the mold shown in Figure 15. The sections 21a of the multiple unit may be easily separated and will appear as shown in Figure 17 as elongated cores or body members 21 of solid cross section. Each of the cured cores or bodies 21 is then enclosed within a strip or sheet 22, preferably calendered, of the uncured rubber which is shown in Figure 18. This operation is indicated in Figure 19 and before this operation, one or both of the cooperating surfaces of the members 21 and 22 are preferably coated with a vulcanizable rubber current 24. The sheet 22 may have a protective film or wrapper 23 on its lower surface which may be of polyethylene or other suitable flexible material although the wrapper could be applied separately to the finished plug.

Although we have described the plug unit as being of cylindrical form, it is to be understood that it may be of other cross sectional forms, for example, angular. The core body 21 should always be of sufficient cross sectional size that it must be stretched to permit positioning in the injury opening so that it will later expand into contact with the wall of the injury opening. If necessary, the unit may be folded on itself any suitable number of times before insertion in the opening and will be permitted to remain in that condition in the opening so as to sufficiently fill and expand against the opening.

It will be apparent that this invention provides for a repair plug which can be inserted in an opening in a tire casing from a point inside or outside the casing. The plug comprises a body of sufficient tensile strength to permit insertion as indicated without coming apart and also an uncured attaching layer which will vulcanize by road heat alone to serve to bond the cured rubber body or core of the plug to the cured rubber wall of the injury opening during use of the tire. The bond will be so effective that the plug cannot be displaced from the injury opening. The uncured layer contains a high sulfur content and a special accelerator in such relative amounts that the indicated bond will result after the unit is inserted and the tire is run for a short period. Furthermore, although the uncured rubber layer is vulcanizable by road heat, it will have indefinite shelf life at normal temperatures. Also, no complicated tools will be required to insert the plug and simultaneously apply a reacting chemical thereto. Other advantages will be apparent.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A plug type repair unit for insertion into an injury opening in a cured rubber tire casing and which will adhere effectively to the cured rubber walls of the injury opening, comprising an elongated core of cured rubber having sufficient tensile strength to permit insertion into the opening, said core having a peripheral wall, a coating of rubber cement on said peripheral wall of the core, and an attaching surrounding layer of uncured vulcanizable rubber enclosing said core in intimate contact with the cement coated peripheral wall thereof, said enclosing layer of uncured vulcanizable rubber containing sulfur and an accelerator in such amounts that said uncured rubber layer is readily vulcanizable by the running temperature of the tire to form a bond between the peripheral wall of the cured rubber core and the cured rubber wall of the injury opening.

2. A unit according to claim 1 in which the core has a tensile strength in excess of 3,000 pounds.

3. A unit according to claim 1 in which the uncured rubber attaching layer has a thickness of at least 0.010 inch.

4. A unit according to claim 2 in which the layer of uncured vulcanizable rubber will vulcanize at a temperature of 160° F. or more.

5. A unit according to claim 4 in which the accelerator in the layer is selected from the thiourea family and is present in amounts ranging from 5% to 9% and the sulfur in the layer is contained in amounts ranging from 5% to 18%, the amounts being by weight of the rubber used in the layer.

6. A unit according to claim 5 in which the accelerator is diphenylthiourea in an amount of about 7% and the sulfur is present in an amount of about 14%.

7. A plug type repair unit for insertion into an injury opening in a cured rubber tire casing and which will adhere effectively to the cured rubber walls of the injury opening, comprising an elongated core of cured rubber having sufficient tensile strength to permit insertion into the opening, said core having a peripheral wall, a coating of rubber cement on said peripheral wall of the core which is substantially free of sulfur or accelerator that will tend to vulcanize it, and an attaching surrounding layer of uncured vulcanizable rubber enclosing said core in intimate contact with the cement coated peripheral wall thereof, said enclosing layer of uncured vulcanizable rubber containing sulfur and accelerator in such amounts that said uncured rubber layer is readily vulcanizable along with the cement by the running temperature of the tire which is at least 160° F. to form a bond between the peripheral wall of the cured rubber core and the cured rubber wall of the injury opening, said sulfur being present in amounts ranging from 5% to 18% and said accelerator being selected from the thiourea family and being present in amounts ranging from 5% to 9%, the amounts being by weight of the rubber used in the layer.

8. A unit according to claim 7 in which the accelerator is diphenylthiourea and is present in an amount of 7% and the sulfur is present in an amount of 14%.

9. A plug type repair unit for insertion into an injury opening in a cured rubber tire casing comprising a core of cured rubber and a surrounding layer of uncured vulcanizable rubber for attaching the core to the wall of the opening when inserted in the opening and upon running of the tire, said surrounding layer containing sulfur in an amount ranging from 5% to 18% and an accelerator selected from the thiourea family in an amount ranging from 5% to 9%, the amounts being by weight of the rubber in the layer, said layer being vulcanizable at a temperature of 160° F. or more.

10. A plug type repair unit according to claim 9 in which the sulfur is present in an amount of about 14% and the accelerator is diphenylthiourea and is present in an amount of about 7%.

References Cited in the file of this patent

UNITED STATES PATENTS

| | | |
|---|---|---|
| 1,490,073 | Shepard et al. | Apr. 8, 1924 |
| 1,514,571 | Sebrell | Nov. 7, 1924 |
| 2,721,185 | Schultz et al. | Oct. 18, 1955 |
| 2,866,494 | Sanderson | Dec. 30, 1958 |

FOREIGN PATENTS

| | | |
|---|---|---|
| 546,957 | Belgium | Apr. 12, 1956 |